United States Patent
Makiuchi et al.

(10) Patent No.: US 8,133,098 B2
(45) Date of Patent: Mar. 13, 2012

(54) TOOL SPINDLE DEVICE

(75) Inventors: Akira Makiuchi, Anjo (JP); Dai Kiyota, Anjo (JP)

(73) Assignee: JTEKT Corporation, Osaka-shi (JP)

( * ) Notice: Subject to any disclaimer, the term of this patent is extended or adjusted under 35 U.S.C. 154(b) by 800 days.

(21) Appl. No.: 12/250,113

(22) Filed: Oct. 13, 2008

(65) Prior Publication Data
US 2009/0148082 A1    Jun. 11, 2009

(30) Foreign Application Priority Data
Dec. 10, 2007    (JP) ................................. 2007-318053

(51) Int. Cl.
*B24B 7/00*    (2006.01)
(52) U.S. Cl. .......... 451/127; 451/150; 409/135; 408/11; 384/462; 384/468; 384/473; 384/474; 184/6.14
(58) Field of Classification Search .................... 451/11, 451/127, 150, 179, 250; 219/69.11; 409/135, 409/136, 230; 408/11, 146; 384/13, 462, 384/468, 473, 474; 184/6.14
See application file for complete search history.

(56) References Cited

U.S. PATENT DOCUMENTS

| | | | | |
|---|---|---|---|---|
| 3,675,517 A * | 7/1972 | Tadayoshi | ....................... | 82/118 |
| 3,689,839 A * | 9/1972 | Cother | ......................... | 368/113 |
| 6,474,913 B2 * | 11/2002 | Katoh et al. | ................... | 409/131 |
| 6,599,066 B1 * | 7/2003 | Koike et al. | .................... | 409/135 |
| 2002/0026700 A1 * | 3/2002 | Jennemann et al. | .............. | 29/42 |
| 2002/0164222 A1 * | 11/2002 | Sato et al. | ...................... | 409/137 |
| 2002/0183178 A1 * | 12/2002 | Katoh et al. | ..................... | 483/30 |
| 2003/0102287 A1 * | 6/2003 | Katsumata et al. | ......... | 219/69.11 |
| 2005/0036846 A1 * | 2/2005 | Kato | ............................. | 409/230 |
| 2005/0063627 A1 * | 3/2005 | Ueda et al. | ..................... | 384/523 |
| 2007/0036625 A1 * | 2/2007 | Kato | ............................. | 409/230 |
| 2009/0034892 A1 * | 2/2009 | Akamatsu et al. | ............ | 384/473 |
| 2010/0074703 A1 * | 3/2010 | Makiyama et al. | ........... | 408/146 |

FOREIGN PATENT DOCUMENTS

JP    9-11108    1/1997

* cited by examiner

*Primary Examiner* — Eileen P. Morgan
(74) *Attorney, Agent, or Firm* — Oblon, Spivak, McClelland, Maier & Neustadt, L.L.P.

(57) ABSTRACT

In a tool spindle device, a tool head is slidably guided along guide members on a support table and is movable by a tool head feed mechanism. A tool spindle with a machining tool such as grinding wheel attached thereto is rotatably supported through antifriction bearings in the tool head. A lubrication mechanism is provided in the tool head for lubricating the antifriction bearings with oil air or oil mist. A space section is formed between the support table and the tool head to house the tool head feed mechanism and the guide members therein. A release passage is provided for releasing the oil air or the oil mist after lubricating the antifriction bearings, into the first space section therethrough to lubricate the tool head feed mechanism and the guide members housed in the space section.

9 Claims, 3 Drawing Sheets

TOOL SPINDLE DEVICE

INCORPORATION BY REFERENCE

This application is based on and claims priority under 35 U.S.C. 119 with respect to Japanese Application No. 2007-318053 filed on Dec. 10, 2007, the entire content of which is incorporated herein by reference.

BACKGROUND OF THE INVENTION

1. Field of the Invention

The present invention relates to a tool spindle device such as a grinding wheel spindle device wherein an antifriction bearing rotatably supporting a tool spindle such as a grinding wheel spindle is lubricated with oil air or oil mist.

2. Discussion of the Related Art

In a wheel head wherein a grinding wheel spindle is rotatably supported by antifriction bearings such as roller bearings, ball bearings or the like, the antifriction bearings are lubricated with oil air. In a grinding wheel spindle device of this kind, oil air is exhausted to the atmosphere after being used to lubricate the antifriction bearings, as described in Japanese unexamined published patent application No. 9-11108 for example.

In the grinding wheel spindle device described in the Japanese patent application, since oil air is released to the atmosphere, an adverse effect is likely to be brought about on the surrounding environment, and oil is uneconomically consumed without effective use.

SUMMARY OF THE INVENTION

It is therefore a primary object of the present invention to provide an improved tool spindle device which is capable of making secondary use of oil air or oil mist after the same is used to lubricate an antifriction bearing rotatably supporting a tool spindle with a machining tool attached thereto.

Briefly, according to the present invention, there is provided a tool spindle device, which comprises a support table; a spindle head slidably guided along at least one guide member on the support table and rotatably supporting a tool spindle with a machining tool through an antifriction bearing; a spindle head feed mechanism for feeding the spindle head along the at least one guide member on the support table; and a lubrication mechanism provided in the spindle head for lubricating the antifriction bearing with oil air or oil mist. The tool spindle device further comprises a first space section formed between the support table and the spindle head to house the spindle head feed mechanism and the at least one guide member therein; and a first release passage for releasing the oil air or the oil mist after lubricating the antifriction bearing into the first space section.

With this construction, since the first space section which houses the spindle head feed mechanism and the at least one guide member therein is provided between the support table and the spindle head and since the oil air or the oil mist after lubricating the antifriction bearing is released through the first release passage into the first space section, it can be realized to make oil in the oil air or the oil mist after lubricating the antifriction bearing, adhere to the spindle head feed mechanism as well as to the at least one guide member. Thus, the spindle head feed mechanism and the at least one guide member can be lubricated to become durable against corrosion caused by rust. In addition, since oil discharged to the atmosphere is deceased by the adhesion to the spindle head feed mechanism and the at least one guide member, the adverse effect on the surrounding environment can be lessened.

In another aspect of the present invention, there is provided a tool spindle device, which comprises a first support table; a second support table slidably guided along at least one first guide member on the first support table; a second support table feed mechanism for feeding the second support table along the at least one first guide member on the first support table; a spindle head slidably guided along at least one second guide member on the second support table in a direction intersecting with the sliding direction of the second support table and rotatably supporting a tool spindle with a machining tool attached thereto, through an antifriction bearing; a spindle head feed mechanism for feeding the spindle head along the at least one second guide member on the second support table; and a lubrication mechanism provided in the spindle head for lubricating the antifriction bearing with oil air or oil mist. The tool spindle device further comprises a space section formed between the first and second support tables to house the second support table feed mechanism and the at least one first guide member therein; and a release passage for releasing the oil air or the oil mist after lubricating the antifriction bearing into the space section.

With this construction, since the space section which houses the second support table feed mechanism and the at least one first guide member therein is provided between the second support table mounting the spindle head thereon and the first support table and since the oil air or the oil mist after lubricating the antifriction bearing is released through the release passage into the space section between the first and second support tables, it can be realized to make oil in the oil air or the oil mist after lubricating the antifriction bearing, adhere to the second support table feed mechanism as well as to the at least one first guide member guiding the second support table on the first support table. Thus, the second support table feed mechanism and the at least one first guide member which are housed in the space section can be lubricated to become durable against corrosion caused by rust. In addition, since oil discharged from the space section to the atmosphere is deceased by the adhesion to the second support table feed mechanism and the at least one first guide member, the adverse effect on the surrounding environment can be lessened.

BRIEF DESCRIPTION OF THE DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT

Figure 1:
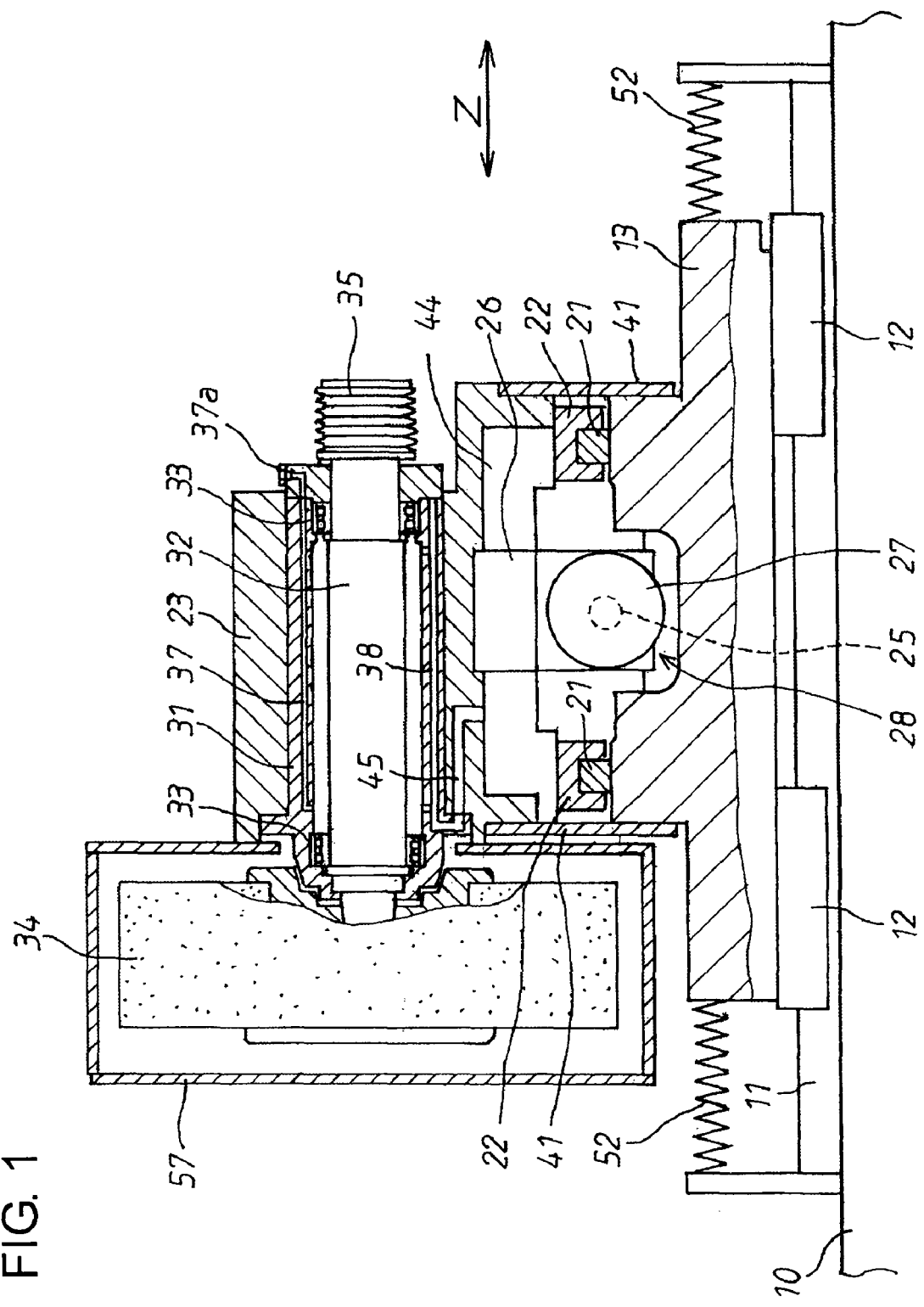
FIG. 1 is a sectional view of a tool spindle device in one embodiment according to the present invention.
Figure 2:
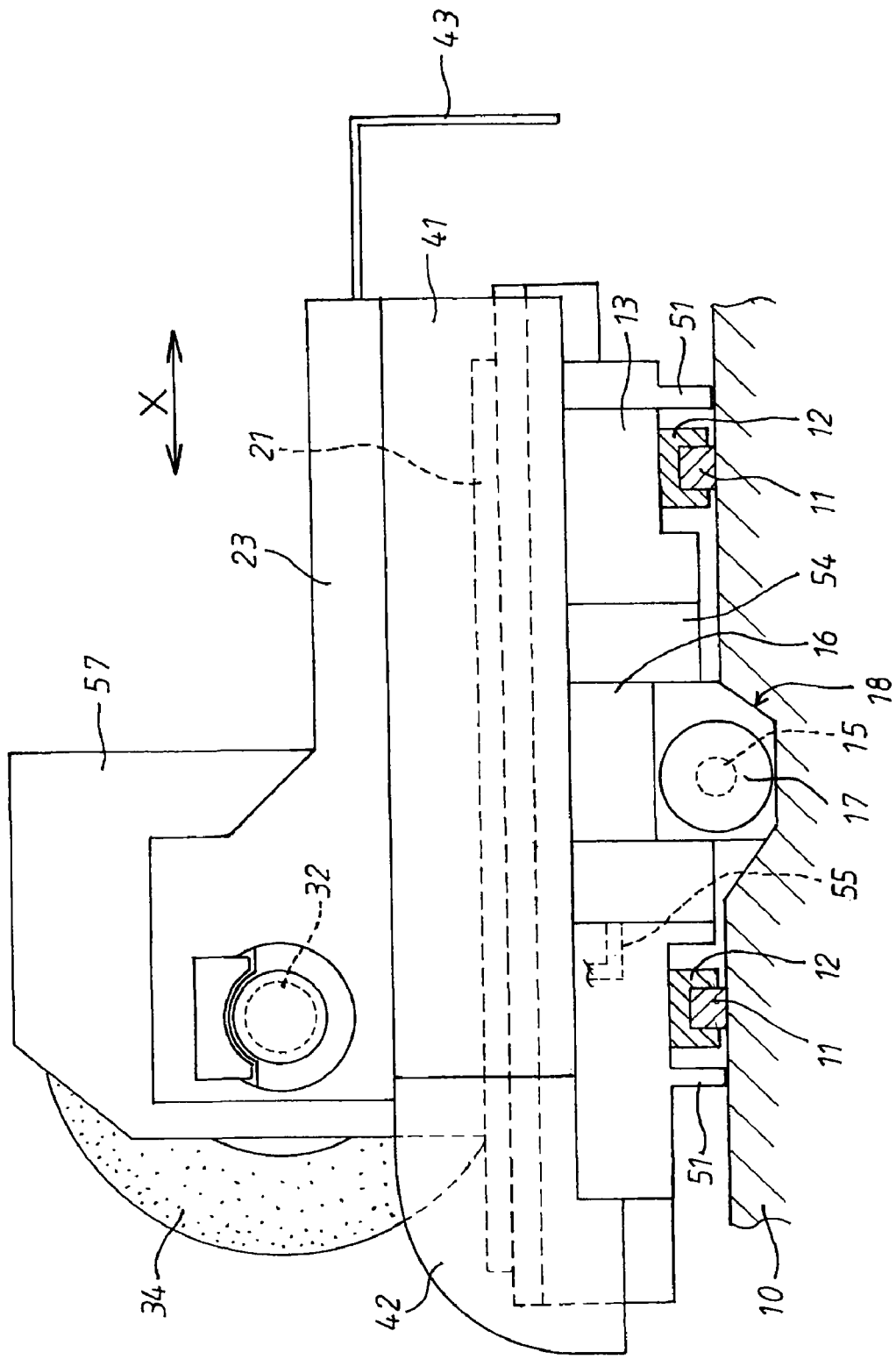
FIG. 2 is a side view, party in section, of the tool spindle device.

Hereafter, a tool spindle device in one embodiment according to the present invention will be described in the form of a grinding wheel spindle device with reference to the accompanying drawings. Referring now to FIGS. 1 and 2, numeral 10 denotes a bed (first support table) of a grinding machine, and a pair of guide rails 11 are fixedly mounted on the bed 10 in a left-right direction (Z-axis direction) as viewed in FIG. 1. A traverse table (second support table) 13 has attached to a bottom surface thereof a plurality (four in this particular embodiment) of guided blocks 12 which are guided on the guided rails 11 to be slidable therealong, and thus, is supported to be slidable on the bed 10 in the Z-axis direction. The bed 10 supports a ball screw shaft 15 to be rotatable about an axis parallel to the Z-axis between the guide rails 11. A feed nut 16 secured to the bottom surface of the traverse table 13 is screw-engaged with the ball screw shaft 15. The ball screw shaft 15 is rotatable by a Z-axis feed servomotor 17 mounted on the bed 10, so that the traverse table 13 is slidden by the operation of the Z-axis feed servomotor 17 in the Z-axis direction. A traverse table feed mechanism (second support table feed mechanism) 18 is constituted by the ball screw shaft 15, the feed nut 16 and the servomotor 17.

Another pair of guide rails 21 are fixedly mounted on a top surface of the traverse table 13 in an X-axis direction perpendicular to the Z-axis direction. A wheel spindle head 23 has attached to a bottom surface thereof a plurality (four in this particular embodiment) of guided blocks 22 which are guided on the guided rails 21 to be slidable therealong, and thus, is supported to be slidable on the traverse table 13 in the X-axis direction. The traverse table 13 supports a ball screw shaft 25 to be rotatable about an axis parallel to the X-axis between the guide rails 21. A feed nut 26 secured to the bottom surface of the wheel spindle head 23 is screw-engaged with the ball screw shaft 25. The ball screw shaft 25 is rotatable by an X-axis feed servomotor 27 mounted on the traverse table 13, so that the wheel spindle head 23 is slidden by the operation of the X-axis feed servomotor 27 in the X-axis direction. A spindle head feed mechanism 28 is constituted by the ball screw shaft 25, the feed nut 26 and the servomotor 27.

A cylindrical bearing unit 31 is fitted in a bearing receiving through bore formed in the wheel spindle head 23. A grinding wheel spindle (tool spindle) 32 is supported in an internal surface of the bearing unit 31 through a plurality of antifriction bearings 33 comprising ball bearings or roller bearings and is rotatable about an axis parallel to the Z-axis. A grinding wheel (machining tool) 34 for grinding a workpiece supported on a work table (both not shown) is attached to one end of the grinding wheel spindle 32. A driven pulley 35 is attached to the other end of the grinding wheel spindle 32 and is in driving connection through several belts with a drive pulley, which is attached to a motor spindle of a wheel drive motor (all not shown) mounted on the wheel spindle head 23.

An oil air supply passage 37 is formed in, favorably, an upper part of the bearing unit 31 for supplying oil air to the antifriction bearings 33. The oil air supplied via the oil air supply passage 37 is introduced into an annular space between the internal surface of the bearing unit 31 and the external surface of the grinding wheel spindle 32. The oil air introduced into the annular space between the internal surface of the bearing unit 31 and the external surface of the grinding wheel spindle 32 reaches the plurality of antifriction bearings 33, so that the same are lubricated. An oil air discharge passage 38 is formed in, favorably, a lower part of the bearing unit 31 for discharging the oil air which lubricated the antifriction bearings 33. The oil air discharge passage 38 is in communication with a first space section 44 referred to later. An inlet port 37a at one end of the oil air supply passage 37 is connected to an oil air supply source (not shown). Thus, a lubrication mechanism is constituted by the inlet port 37a, the oil air supply passage 37, the annular space between the internal surface of the bearing unit 31 and the external surface of the grinding wheel spindle 32, and the like.

A pair of side covers 41 are attached to both side surfaces of the wheel spindle head 23 to extend in the X-axis direction. The pair of side covers 41 respectively face both side walls of the traverse table 13 with respective slight clearances therebetween and are movable bodily with the wheel spindle head 23 in the X-axis direction as if they are slidden along the both side walls of the traverse table 13. A front face cover 42, which is composed of two members coupled to be extensible and contractible as well-known in the art, is attached to the front side of the wheel spindle head 23. Further, a rear face cover 43 is attached to the rear end surface of the wheel spindle head 23. The rear face cover 43 is configured to close the rear part of the traverse table 13 when the wheel spindle head 23 is at an advance position (i.e., grinding position). The rear face cover 43 is somewhat deformable upon contact with the rear part of the traverse table 13 to absorb an infeed movement of the wheel spindle head 23 relative to the traverse table 13. The side covers 41, the front face cover 42 and the rear face cover 43 configure the first space section 44 which is substantially closed from the outside, between the wheel spindle head 23 and the traverse table 13. The spindle head feed mechanism 28 including the guide rails 21, the ball screw shaft 25 and the like is housed in the first space section 44, which is closed from the outside to server as a soft airtight chamber or a low-pressure retention chamber which allows air blow to be vented from clearances existing between the covers 41-43 and those parts facing the same of the traverse table 13.

The first space section 44 is in communication with the oil air discharge passage 38 through a first release passage 45 opening at a bottom portion of the wheel spindle head 23, so that the oil air discharged to the oil air discharge passage 38 is released into the first space section 44 between the wheel spindle head 23 and the traverse table 13. Further, oil in the oil air released into the first space section 44 adheres to guide surfaces of the guide rails 21 as well as to the external surface of the ball screw shaft 25 of the spindle head feed mechanism 28 which are housed in the first space section 44.

As a consequence, the used oil which lubricated the antifriction bearings 33 can lubricate the guide rails 21 and the ball screw shaft 25 and also contributes to anticorrosion. Further, since the oil adheres to the guide surfaces of the guide rails 21 as well as to the external surface of the ball screw shaft 25, it becomes possible to reduce the quantity of oil which should be mixed with air in making the oil air.

The traverse table 13 has formed thereon another pair of side covers 51, which are suspended therefrom at outsides or front and rear sides of the guide rails 11 to extend in the Z-axis direction. The pair of side covers 51 face the upper surface of the bed 10 at respective lower ends thereof. Further, bellows covers 52 are attached between the bed 10 and the opposite ends in the traverse direction of the traverse table 13. A second space section 54 which is substantially closed from the outside is formed with the pair of side covers 51 and the bellows covers 52 arranged between the traverse table 13 and the bed 10. The second space section 54 houses the guide rails 11, the ball screw shaft 15 and the like and serves as a soft airtight chamber or a low-pressure retention chamber which allows air blow to be vented from clearances existing between the covers 51, 52 and those parts facing the same of the bed 10.

The second space section 54 is in communication with the first space section 44 through a second release passage 55 formed in the traverse table 13, so that the oil air released into the first space section 44 is released into the second space section 54 between the traverse table 13 and the bed 10 by way of the second release passage 55. Oil in the oil air released into the second space section 54 adheres to guide surfaces of the guide rails 11 as well as to the external surface of the ball screw shaft 15 of the traverse table feed mechanism 18 which are housed in the second space section 54, in the same manner as described above.

The bed 10 and the traverse table 13 respectively constitute first and second support tables in the claimed invention. Further, the guide rails 11, 21 constitute guide members in the claimed invention, and the traverse table feed mechanism 18 constitutes a second support table feed mechanism in the claimed invention.

Numeral 57 denotes a wheel cover surrounding the grinding wheel 34, and the wheel cover 57 is secured to the wheel spindle head 23.

Next, description will be made regarding the operation of the grinding wheel spindle device as constructed above. A workpiece supported on the work table (both not shown) is ground with the grinding wheel 34 on the grinding wheel spindle 32 rotating on the wheel spindle head 23, through the traverse feed motion of the traverse table 13 in the Z-axis direction and the back and forth movement of the wheel spindle head 23 in the X-axis direction.

The antifriction bearings 33 which rotatably support the grinding wheel spindle 32 are supplied with oil air through the oil air supply passage 37, and the bearings 33 are lubricated with the oil air. The oil air which lubricated the bearings 33 is discharged to the oil air discharge passage 38. The oil air discharged into the oil air discharge passage 38 is released through the first release passage 45 into the first space section 44 formed between the wheel spindle head 23 and the traverse table 13. The oil air released into the first space section 44 is further released from the first space section 44 through the second release passage 55 into the second space section 54 formed between the traverse table 13 and the bed 10.

Oil in the oil air released into the first space section 44 adheres to the guide surfaces of the guide rails 21 as well as to the external surface of the ball screw shaft 25 which are housed in the first space section 44, and serves to prevent the guide rails 21 and the ball screw shaft 25 from being corroded by rust. Further, oil in the oil air released in the second space section 54 adheres to the guide surfaces of the guide rails 11 as well as to the external surface of the ball screw shaft 15 of the traverse table feed mechanism 18 which are housed in the second space section 54, and serves to prevent the guide rails 11 and the ball screw shaft 15 from being corroded by rust.

The oil air released into the first space section 44 is partly exhausted outside the grinding machine through clearances at the cover members 41-43 between the wheel spindle head 23 and the traverse table 13, and the oil air released into the second space section 54 is exhausted outside the grinding machine through clearances at the cover members 51, 52 between the traverse table 13 and the bed 10. However, the oil in the oil air adheres to the respective guide surfaces of the guide rails 11, 21 and to the respective external surfaces of the ball screw shafts 15, 25 which are housed in the first and second space sections 44, 54, and thus, the oil air exhausted outside the grinding machine is diluted or weakened in the density of oil, so that the adverse effect on the surrounding environment can be lessened.

In this case, since each of the first and second space sections 44, 54 is configured to be a soft airtight chamber or a low-pressure retention chamber, the oil air released into the space sections 44, 54 serves to increase the interior pressures of the space sections 44, 54. Thus, the oil air exhausted from the space sections 44, 54 makes air blow to prevent coolant used during a grinding operation from coming into the space sections 44, 54, so that it becomes possible to protect the respective guide surfaces of the guide rails 11, 21 and the ball screw shafts 15, 25 from coolant.

In this embodiment, it is not so important requirement to configure the first and second space sections 44, 54 as soft airtight chambers or low-pressure retention chambers. Rather, it should be noted as a more important requirement to provide the configuration that the oil air which was discharged after lubricating the antifriction bearings 33 is discharged in turn through the first and second space sections 44, 54. Where the first and second space sections 44, 54 are not configured as soft airtight chambers or low-pressure retention chambers, on the contrary, it would take place that oil air is exhausted outside from each of the first and second space sections 44, 54. However, oil in the oil air so discharged has been decreased in quantity and has been diluted in density, and therefore, the adverse effect on the surrounding environment can be lessened also in this case.

As described above, in the foregoing embodiment, the oil air which is discharged after lubricating the antifriction bearings 33 is subjected to secondary use to lubricate the guide rails 11, 21, the ball screw shafts 15, 25 and the like and can be economically used without being exhausted uselessly. In addition, the adverse effect on the surrounding environment can be lessened.

Further, in the foregoing embodiment, the oil air is released into the first space section 44 in the beginning and then, from the first space section 44 into the second space section 54. This configuration ensures that the effects or advantages of oil adhesion and air blow can be achieved more remarkably at the first space section 44 which has much more harmful influence of coolant than the second space section 45 does.

Figure 3:
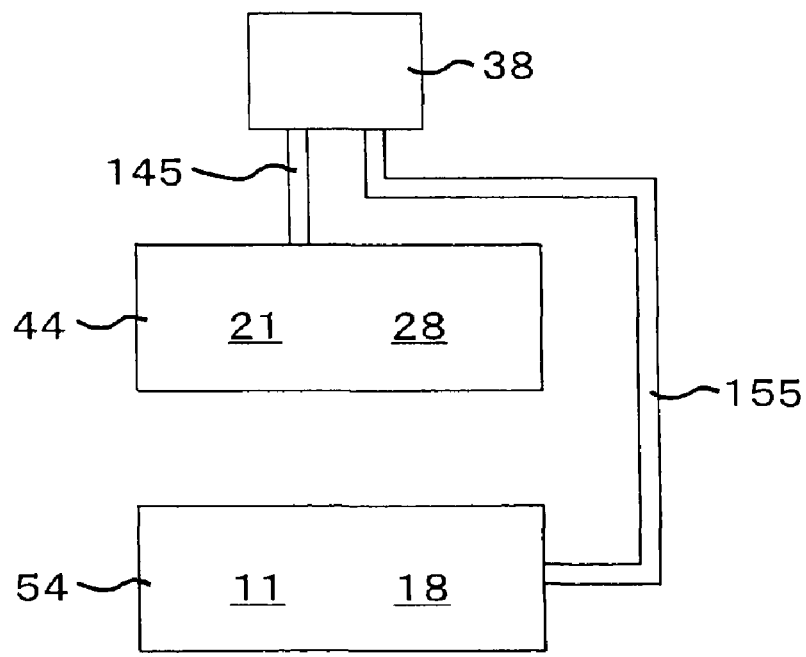
FIG. 3 is a simplified circuit diagram showing release passages for oil air in a modified form of the embodiment.

FIG. 3 shows a modified form of the foregoing embodiment in a schematic diagram. In the foregoing embodiment, the oil air which is discharged from the oil air discharge passage 38 after lubricating the antifriction bearings 33 is released into the second space section 54 after passing through the first space section 44. In the modified form shown in FIG. 3, on the contrary, the oil air discharged from the oil air discharge passage 38 is released parallel into the first and second space sections 44, 54 through first and second release passages 145, 155. With this modified configuration, lubrication on the same condition can be done for the guide rails 21 and the spindle head feed mechanism 28 which are housed in the first space section 44 as well as for the guide rails 11 and the traverse table feed mechanism 18 which are housed in the second space section 54.

In another modified form, there may be taken another configuration that the oil air which is discharged from the oil air discharge passage 38 after lubricating the antifriction bearings 33 is released only into the second space section 54 through the aforementioned second release passage 155.

Figure 4:
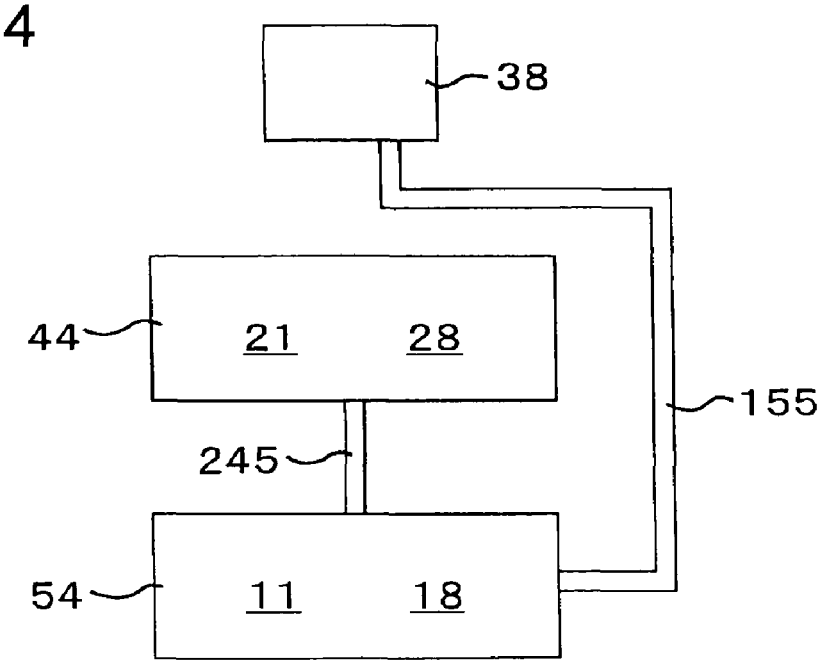
FIG. 4 is another simplified circuit diagram showing release passages for oil air in a further modified form of the embodiment.

Further, as shown in FIG. 4, there may be taken still another modification wherein the oil air which is discharged from the oil air discharge passage 38 after lubricating the antifriction bearing 33 is released into the second space section 54 through the second release passage 155 in the beginning and then, is released from the second space section 54 into the first space section 44 through a communication release passage 245 which makes the second space section 54 communicate with the first space section 44. In this modified form, it can be done to make a more quantity of oil adhere to the guide rails 11 and the traverse table feed mechanism 18 which respectively operate to guide and feed the traverse table 13.

In the foregoing embodiment, description has been made taking the example wherein the wheel spindle head 23 movable back and forth in the X-axis direction is mounted on the traverse table 23 slidable in the Z-axis direction. However, the traverse table 13 is not necessarily an essential requirement to the present invention. The present invention is applicable to a grinding machine of the construction that the wheel spindle head 23 is mounted directly on the bed 10 to be movable back and forth in the X-axis direction. In this case, as a matter of course, the oil air which is discharged from the oil air discharge passage 38 after lubricating the antifriction bearings 33 is exhausted to the atmosphere after being released into the first space section 44 between the bed 10 and the wheel spindle head 23.

Further, as mentioned earlier in the foregoing embodiment, also where the present invention is applied to the grinding machine of the construction wherein the wheel spindle head 23 movable back and forth in the X-axis direction is mounted on the traverse table 13 slidable in the Z-axis direction, the passage arrangements for oil air may be made as follows. That is, the passage arrangements for oil air are so made that the oil air which is discharged from the oil air discharge passage 38 after lubricating the antifriction bearings 33 is supplied only to the first space section 44 between the wheel spindle head 23 and the traverse table 13 through the release passage 45, but is not supplied to the second space section 54 between the traverse table 13 and the bed 10.

Further, although in the foregoing embodiment, the spindle head feed mechanism 28 has been described in the form that uses the ball screw shaft 25 and the servomotor 27 for driving the same, it may be configured in the form that uses a linear motor.

Further, in the foregoing embodiment, description has been made regarding the grinding machine which is provided with the grinding wheel head 23 movable back and forth in the X-axis direction. Instead, the present invention is applicable to an angular slide grinding machine of the construction that a wheel spindle head is movable back and forth in a direction which is inclined a predetermined angle relative to the X-axis.

Moreover, although in the foregoing embodiment, description has been made taking the grinding machine as an example, the present invention is also applicable to a machine tool of any other kind that uses a cutting tool or any other machining tool attached to a tool spindle which is rotatably supported on a tool spindle head movable in a direction.

Further, although in the foregoing embodiment, description has been made taking oil air as lubricant for the antifriction bearings 33, oil mist may be used in place of oil air.

Various features and many of the attendant advantages in the foregoing embodiment and the modified forms thereof will be summarized as follows:

In the tool spindle device in the foregoing embodiment shown in FIGS. 1 and 2, since the first space section 44 which houses the spindle head feed mechanism 28 and the guide members 21 therein is provided between the support table (traverse table) 13 and the tool (wheel) spindle head 23 and since the oil air or the oil mist after lubricating the antifriction bearings 33 is released through the first release passage 45 into the first space section 44, it can be realized to make oil in the oil air or the oil mist after lubricating the antifriction bearings 33, adhere to the spindle head feed mechanism 28 as well as to the guide members 21. Thus, the spindle head feed mechanism 28 and the guide members 21 can be lubricated to become durable against corrosion caused by rust. In addition, since oil exhausted from the first space section 44 to the atmosphere is deceased by the adhesion to the spindle head feed mechanism 28 and the guide members 21, the adverse effect on the surrounding environment can be lessened.

Also in the foregoing embodiment, since the cover members 41-43 provided between the traverse table 13 and the tool spindle head 23 for covering clearances formed therebetween to make the first space section 44 a soft airtight chamber or a low-pressure retention chamber, the interior pressure of the first space section 44 is increased, so that coolant used during a machining operation can be prevented from entering the first space section 44.

Also in the foregoing embodiment, the support table comprises the first support table (bed) 10 and the second support table (traverse table) 13 slidably guided along the guide members 11 on the first support table 10, the spindle head 23 is slidably guided along the guide members 21 on the second support table 13 in a direction intersecting with the sliding direction of the second support table 13, and the oil air or oil mist released into the first space section 44 is further released into the second space section 54 formed between the first and second support tables 10, 13. Thus, the oil air or the oil mist after lubricating the antifriction bearings 33 can be effectively utilized not only to lubricate the spindle head feed mechanism 28 and the guide members 21 for the spindle head 23, but also to lubricate the second support table feed mechanism 18 and the guide members 11 for the second support table 13.

Also in the foregoing embodiment, since the cover members 51, 52 are provided between the first and second support tables 10, 13 for covering clearances formed therebetween to make the second space section 54 another soft airtight chamber or another low-pressure retention chamber, the interior pressure of the second space section 54 is increased, so that coolant used during a machining operation can be prevented from entering the second space section 54.

In the modified forms shown in FIGS. 3 and 4 of the foregoing embodiment, since the second space section 54 which houses the second support table feed mechanism 18 and the guide members 11 therein is provided between the first support table (bed) 10 and the second support table (traverse table) 13 and since the oil air or the oil mist after lubricating the antifriction bearings 33 is released through the release passage 155 into the second space section 54, it can be realized to make oil in the oil air or the oil mist after lubricating the antifriction bearings 33, adhere to the second support table feed mechanism 18 as well as to the guide members 11. Thus, the second support table feed mechanism 18 and the guide members 11 can be lubricated to become durable against corrosion caused by rust. In addition, since oil exhausted from the second space section 54 to the atmosphere is deceased by the adhesion to the second support table feed mechanism 18 and the guide members 11, the adverse effect on the surrounding environment can be lessened.

In the modified form shown in FIG. 3 of the foregoing embodiment, since the space section 44 which houses the spindle head feed mechanism 28 and the guide members 21 therein is provided between the second support table (traverse table) 13 and the spindle head 23 and since the oil air or the oil mist after lubricating the antifriction bearings 33 is released parallel into the space section 54 between the first and second support tables 10, 13 and the space section 44 between the second support table 13 and the spindle head 23, lubrication on the same condition can be done for the guide members 21 and the spindle head feed mechanism 28 which are housed in the space section 44 as well as for the guide members 11 and the second support table feed mechanism 18 which are housed in the space section 54.

In the modified form shown in FIG. 4 of the foregoing embodiment, since the space section 44 which houses the spindle head feed mechanism 28 and the guide members 21 therein is provided between the second support table (traverse table) 13 and the spindle head 23 and since the oil air or the oil mist after lubricating the antifriction bearings 33 is released from the space section 54 between the first and second support tables 10, 13, through the communication release passage 245 into the space section 44 between the second support table 13 and the spindle head 23, it becomes possible to increase the quantity of the oil which adheres to the second support table feed mechanism 18 and the guide members 11 guiding the second support table 13.

Obviously, numerous further modifications and variations of the present invention are possible in light of the above teachings. It is therefore to be understood that within the scope of the appended claims, the present invention may be practiced otherwise than as specifically described herein.

What is claimed is:

1. A tool spindle device comprising:
   a support table;
   a spindle head slidably guided along at least one guide member on the support table and rotatably supporting a tool spindle with a machining tool through antifriction bearings;
   a spindle head feed mechanism for feeding the spindle head along the at least one guide member on the support table;
   a lubrication mechanism provided in the spindle head for lubricating the antifriction bearings with oil air or oil mist;
   a first space section formed between the support table and the spindle head to house the spindle head feed mechanism and the at least one guide member therein; and
   a first release passage communicating the lubrication mechanism for lubricating the antifriction bearings with the first space section, for releasing the oil air or the oil mist after lubricating the antifriction bearings into the first space section.

2. The tool spindle device as set forth in claim 1, further comprising first cover members provided between the support table and the spindle head for covering clearances formed therebetween to make the first space section a low-pressure retention chamber.

3. The tool spindle device as set forth in claim 1, wherein the support table comprises a first support table and a second support table slidably guided along at least one guide member on the first support table and wherein the spindle head is slidably guided along the at least one guide member on the second support table in a direction intersecting with the sliding direction of the second support table, the device further comprising:
   a second support table feed mechanism for feeding the second support table along the at least one guide member on the first support table;
   a second space section formed between the first and second support tables to house the second support table feed mechanism and the at least one guide member for the second support table therein; and
   a second release passage for releasing the oil air or the oil mist from the first space section into the second space section.

4. The tool spindle device as set forth in claim 3, further comprising second cover members provided between the first and second support tables for covering clearances formed therebetween to make the second space section another low-pressure retention chamber.

5. The tool spindle device as set forth in claim 1, wherein the spindle head is a wheel spindle head rotatably supporting a wheel spindle as the tool spindle on which a grinding wheel is attached as the machining tool.

6. A tool spindle device comprising:
   a first support table;
   a second support table slidably guided along at least one first guide member on the first support table;
   a second support table feed mechanism for feeding the second support table along the at least one first guide member on the first support table;
   a spindle head slidably guided along at least one second guide member on the second support table in a direction intersecting with the sliding direction of the second support table and rotatably supporting a tool spindle with a machining tool attached thereto, through antifriction bearings;
   a spindle head feed mechanism for feeding the spindle head along the at least one second guide member on the second support table;
   a lubrication mechanism provided in the spindle head for lubricating the antifriction bearings with oil air or oil mist;
   a space section formed between the first and second support tables to house the second support table feed mechanism and the at least one first guide member therein; and
   a release passage communicating the lubrication mechanism for lubricating the antifriction bearings with the space section, for releasing the oil air or the oil mist after lubricating the antifriction bearings into the space section.

7. The tool spindle device as set forth in claim 6, further comprising:
   another space section formed between the second support table and the spindle head to house the spindle head feed mechanism and the at least one second guide member therein; and
   another release passage for releasing the oil air or the oil mist after lubricating the antifriction bearings into the another space section between the second support table and the spindle head therethrough so that the oil or the mist after lubricating the antifriction bearings is released parallel into the space section between the first and second support tables and the another space section between the second support table and the spindle head.

8. The tool spindle device as set forth in claim 6, further comprising:
   another space section formed between the second support table and the spindle head to house the spindle head feed mechanism and the at least one second guide member therein; and
   another release passage for releasing the oil air or the oil mist from the space section between the first and second support tables, therethrough into the another space section between the second support table and the spindle head.

9. The tool spindle device as set forth in claim 6, wherein the spindle head is a wheel spindle head for rotatably supporting a wheel spindle as the tool spindle on which a grinding wheel is attached as the machining tool.

* * * * *